(12) United States Patent
Sun et al.

(10) Patent No.: US 12,184,387 B2
(45) Date of Patent: Dec. 31, 2024

(54) BEAM MANAGEMENT FOR DISTRIBUTED MULTI-ANTENNA SYSTEMS

(71) Applicant: Apple Inc., Cupertino, CA (US)

(72) Inventors: Wanlu Sun, San Diego, CA (US); Sharad Sambhwani, San Diego, CA (US)

(73) Assignee: Apple Inc., Cupertino, CA (US)

( * ) Notice: Subject to any disclaimer, the term of this patent is extended or adjusted under 35 U.S.C. 154(b) by 129 days.

(21) Appl. No.: 17/948,784

(22) Filed: Sep. 20, 2022

(65) Prior Publication Data

US 2024/0097773 A1    Mar. 21, 2024

(51) Int. Cl.
*H04B 7/08*       (2006.01)
*H04B 7/024*      (2017.01)
*H04B 7/0491*     (2017.01)
*H04B 17/318*     (2015.01)

(52) U.S. Cl.
CPC ............. *H04B 7/088* (2013.01); *H04B 7/024* (2013.01); *H04B 7/0491* (2013.01); *H04B 17/318* (2015.01)

(58) Field of Classification Search
CPC ........ H04B 7/024; H04B 7/04; H04B 7/0404; H04B 7/0408; H04B 7/0413; H04B 7/0452; H04B 7/0617; H04B 7/0695; H04B 7/06952; H04B 7/06958; H04B 7/088; H04B 17/318
USPC ........ 375/259, 260, 267; 343/725, 729, 753; 370/328, 334, 343; 455/456.1, 456.5, 455/456.6
See application file for complete search history.

(56) References Cited

U.S. PATENT DOCUMENTS

2020/0145977 A1* 5/2020 Kumar ..................... G01S 5/12
2022/0345185 A1* 10/2022 Michalopoulos .... H04B 7/0617
2022/0373635 A1* 11/2022 Bao ....................... G01S 5/0236

* cited by examiner

*Primary Examiner* — Young T. Tse
(74) *Attorney, Agent, or Firm* — FLETCHER YODER PC

(57) ABSTRACT

A distributed multi-antenna system includes a first access point configured to emit first beams to a user equipment device. The first access point is also configured to receive, from the user equipment device, an indication of a first beam selected from the first beams via a beam sweeping procedure. The distributed multi-antenna system also includes a second access point configured to receive, from the user equipment device or the first access point, the indication. The second access point is also configured to emit a second beam of second beams corresponding to the second access point to transmit data to the user equipment device based on the indication and a location of the second access point.

20 Claims, 11 Drawing Sheets

BEAM MANAGEMENT FOR DISTRIBUTED MULTI-ANTENNA SYSTEMS

BACKGROUND

The present disclosure relates generally to wireless network telecommunications. More specifically, the present disclosure relates to beam management for distributed multi-antenna systems employed in wireless network telecommunications.

Wireless communication systems typically include a user equipment device, such as a mobile phone, communicatively coupled with an access point (e.g., a base station, a cellular tower, etc.) configured to emit a number of beams via a corresponding number of antennas. In traditional systems, various beam sweeping procedures may be performed to identify a desirable beam (and corresponding sub-set of antennas) from the access point for transmitting data to the user equipment device. In certain instances, the user equipment device may be communicatively coupled with (or within range for communicatively coupling with) multiple access points at a given moment in time. However, performing beam sweeping procedures relative to multiple access points may cause excess latency and may be cumbersome, time consuming, resource exhaustive, and/or expensive. Accordingly, it is now recognized that improved beam management for distributed multi-antenna systems is desired.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a distributed multi-antenna system includes a first access point configured to emit first beams to a user equipment device. The first access point is also configured to receive, from the user equipment device, an indication of a first beam selected from the first beams via a beam sweeping procedure. The distributed multi-antenna system also includes a second access point configured to receive, from the user equipment device or the first access point, the indication. The second access point is also configured to emit a second beam of second beams corresponding to the second access point to transmit data to the user equipment device based on the indication and a location of the second access point.

In another embodiment, a user equipment device includes an antenna assembly, a receiver, and a transmitter. The receiver is configured to receive, via the antenna assembly and from a first access point of a distributed multi-antenna system, first beams. The transmitter is configured to transmit, via the antenna assembly, to a second access point of the distributed multi-antenna system, and based on a first location of the first access point, a second location of the second access point, and a first angle of arrival of a first beam selected from the first plurality of beams via a plurality of signal strength measurements corresponding to the first plurality of beams, an indication of a second beam selected from a second plurality of beams corresponding to the second access point or a second angle of arrival corresponding to the second beam.

In yet another embodiment, one or more tangible, non-transitory, computer-readable media stores instructions thereon that, when executed by one or more processors, are configured to cause the one or more processors to perform various functions. The functions include receiving a first indication of a first beam of first beams transmitted by a first access point to a user equipment device, the first indication of the first beam being based on signal strength measurements of the first beams. The functions also include receiving a second indication of a second beam of second beams corresponding to a second access point, the second indication of the second beam being based on the first indication and location data indicative of a first location of the first access point and a second location of the second access point. The functions also include establishing a communication path between the user equipment device and the second access point via the second indication of the second beam.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
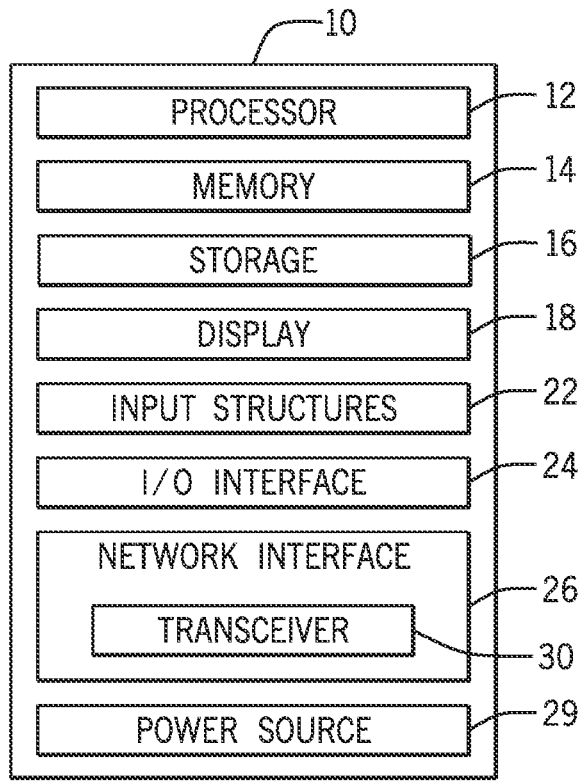
FIG. 1 is a block diagram of an electronic device, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on).

This disclosure is directed to beam management for distributed multi-antenna systems employed in wireless network telecommunications. In accordance with the present disclosure, a distributed multi-antenna system may include multiple access points (e.g., base stations, cellular towers, radio units (RUs), transmission and reception points (TRPs), etc.), such as three or more access points, configured to communicatively interface with a user equipment device, such as a mobile phone. Each access point may include a number of antennas configured to transmit a corresponding number of beams to the user equipment device. Various transmission ("TX") beam sweeping procedures may be employed to identify, relative to the user equipment device, a desired beam (and corresponding sub-set of antennas) from a first access point. Various receiving ("RX") beam sweeping procedures may also be employed to identify a desired RX beam employed by the user equipment device with respect to the first access point. It should be noted that reference below to beam sweeping procedures employed to identify a desired beam from an access point may imply TX beam sweeping procedures, and reference below to beam sweeping procedures employed to identify a desired beam from the user equipment device may imply RX beam sweeping procedures.

As described above, the user equipment device may be communicatively coupled (or in range to communicatively couple) with multiple access points of the distributed multi-antenna system at a given moment or over a given interval in time. In traditional systems, beam sweeping procedures may be employed for each access point of the distributed multi-antenna system with respect to the user equipment. In this way, desired beams for each of the multiple access points may be determined, which may provide redundancy, enable transmission of different types of data across the network, enable transmission of data to specific sources in the network, and/or other technical benefits. However, performing beam sweeping procedures for each access point of the distributed multi-antenna system with respect to the user equipment device may cause excess latency and may be cumbersome, time consuming, resource exhaustive, and/or expensive In accordance with the present disclosure, various information may be employed to identify desirable beams from various access points of the distributed multi-antenna system, without performing beam sweeping procedures for the various access points. For example, in an embodiment of the present disclosure, beam sweeping procedures may be performed with respect to a first sub-set of access points (e.g., one or more access points) and not a second sub-set of access points (e.g., one or more other access points). The information employed to identify desirable beams from the second sub-set of access points (e.g., without beam sweeping procedures for the second sub-set of access points) may include, for example, locations of various access points of the distributed multi-antenna system, data identifying beams selected from the first sub-set of access points via beam sweeping procedures (e.g., including angles of arrival the selected beams), or a combination thereof. Other information may also be employed in accordance with the present disclosure. These and other features will be described in detail below with reference to the drawings.

With the foregoing in mind, FIG. 1 is a block diagram of an electronic device or mobile communication device 10, according to embodiments of the present disclosure. The electronic device 10 may be referred to in certain instances of the present disclosure as a user equipment device. The electronic device 10 may include, among other things, one or more processors 12 (collectively referred to herein as a single processor for convenience, which may be implemented in any suitable form of processing circuitry), one or more memories 14 (collectively referred to herein as a single memory for convenience, which may be implemented in any suitable from of memory circuitry), nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions), or a combination of both hardware and software elements (which may be referred to as logic). The processor 12, the memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be generally referred to herein as "data processing circuitry." Such data processing circuitry may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may perform the various functions described herein.

In the electronic device 10 of FIG. 1, the processor 12 may be operably coupled with the memory 14 and the nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol.

The network interface 26 may include, for example, one or more interfaces for a terrestrial (e.g., land-based) network or non-terrestrial network (NTN), a peer-to-peer (P2P) connection, a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®), and/or for a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, and so on.

The network interface 26 can further communicate via NTNs, or segments of such networks, using an airborne or spaceborne vehicle (e.g., satellite) for transmission. As used herein, airborne vehicles refer to High Altitude Platforms (HAPs) encompassing satellites, Unmanned Aircraft Systems (UAS)—including tethered UAS, Lighter than Air UAS and Heaver than Air UAS—operating at altitude; typically between 8 and 50 kilometers, quasi stationary. In particular, the network interface 26 may include, for example, one or more interfaces for using a cellular communication standard of the 5G specifications that include the millimeter wave (mmWave) frequency range (e.g., 24.25-300 gigahertz (GHz)), or possible 6G specifications that include the sub-THz range (e.g., 100-300 GHz). The network interface 26 of the electronic device 10 may allow communication over the aforementioned networks (e.g., 5G, Wi-Fi, LTE-LAA, and so forth). The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, UWB network, alternating current (AC) power lines, and so forth. The network interface 26 may, for instance, include a transceiver 30 for communicating data using one of the aforementioned networks. The power source 29 of the electronic device 10 may include any suitable source of power, such as a rechargeable lithium polymer (Li-poly) battery and/or an alternating current (AC) power converter.

Figure 2:
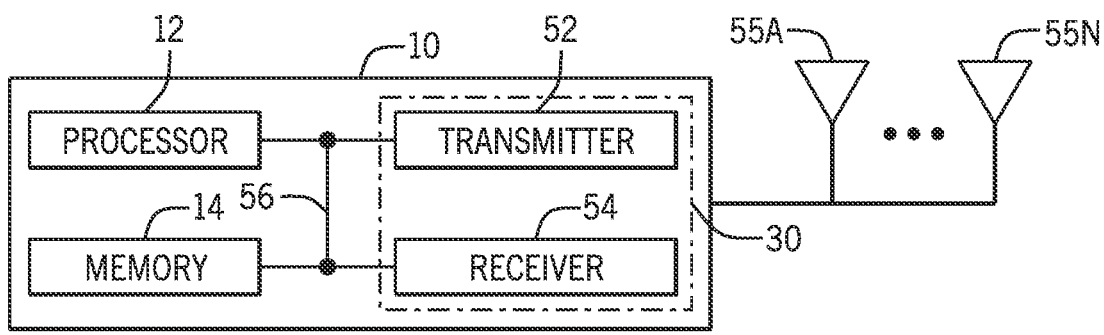
FIG. 2 is a functional diagram of the electronic device of FIG. 1, according to embodiments of the present disclosure.

FIG. 2 is a functional diagram of the electronic device 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive signals between one another.

The electronic device 10 may include the transmitter 52 and/or the receiver 54 that respectively enable transmission and reception of signals between the electronic device 10 and an external device via, for example, a network (e.g., including base stations or access points) or a direct connection. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, multiple antennas of the antennas 55A-55N of an antenna group or module may be communicatively coupled a respective transceiver 30 and each emit radio frequency signals that may constructively and/or destructively combine to form a beam. The electronic device 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

Figure 3:
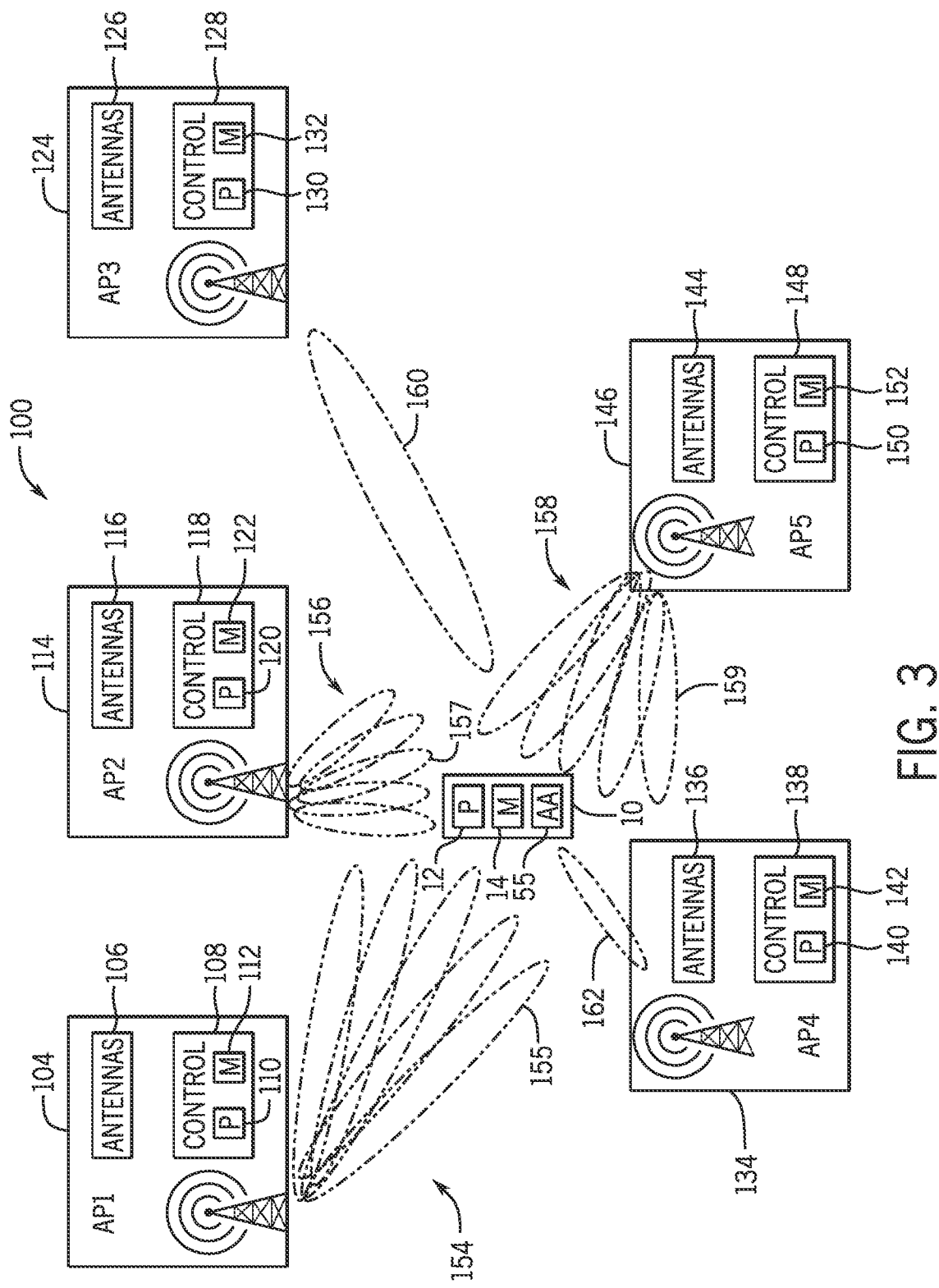
FIG. 3 is a schematic diagram of a distributed multi-antenna system configured to identify desirable beams for transmitting data between access points (e.g., base stations, cellular towers) of the distributed multi-antenna system and a user equipment device of the distributed multi-antenna system, according to the present disclosure.

FIG. 3 is a schematic diagram of an embodiment of a distributed multi-antenna system 100 configured to identify desirable beams for transmitting data between access points (e.g., base stations, cellular towers) of the distributed multi-antenna system 100 and the user equipment device 10. In the illustrated embodiment, the system 100 includes a first access point 104 having first antennas 106 and a first controller 108 including first processing circuitry 110 and first memory circuitry 112, a second access point 114 having second antennas 116 and a second controller 118 including second processing circuitry 120 and second memory circuitry 122, a third access point 124 having third antennas 126 and a third controller 128 including third processing circuitry 130 and third memory circuitry 132, a fourth access point 134 having fourth antennas 136 and a fourth controller 138 including fourth processing circuitry 140 and fourth memory circuitry 142, and a fifth access point 144 having fifth antennas 146 and a fifth controller 148 including fifth processing circuitry 150 and fifth memory circuitry 152. The user equipment device 10 includes the processing circuitry 12, the memory circuitry 14, and the antenna assembly 55 (e.g., including one or more antennas) as previously described.

In the illustrated embodiment, beam sweeping procedures may be performed, relative to the user equipment device 10, for the first access point 104, the second access point 114, and the fifth access point 144. For example, as shown, the first access point 104 may transmit first beams 154 (e.g., via the first antennas 106) toward the user equipment device 10, the second access point 114 may transmit second beams 156 (e.g., via the second antennas 116) toward the user equipment device 10, and the fifth access point 144 may transmit fifth beams 158 (e.g., via the fifth antennas 146) toward the user equipment device 10. The user equipment device 10 may measure or otherwise determine various aspects of the first beams 154 received from the first access point 104 to identify a first desirable beam 155 of the first beams 154, where the first desirable beam 155 is subsequently used for transmitting data from the first access point 104 to the user equipment device 10. For example, the user equipment device 10 may determine reference signal received power (RSRP) measurements of each beam of the first beams 154, may determine beam indexes of each beam of the first beams 154, or both. Selection of the first desirable beam 155 from the first beams 154 may be based on the RSRP measurements and/or the beam indexes described above.

Further, the user equipment device 10 may transmit data identifying the first desirable beam 155 to the first access point 104 and, in some embodiments, to one or more of the other access points 114, 124, 134, 144. The same or similar beam sweeping procedures described above may be performed with respect to the first access point 104 to identify a second desirable beam 157 of the second beams 156 of the second access point 114, to identify a fifth desirable beam 158 of the fifth beams 158 of the fifth access point 144, or both.

In accordance with the present disclosure, the distributed multi-antenna system 100 may be configured to identify a third desirable beam 160 of the third access point 124 for transmitting data to the user equipment device 10, a fourth desirable beam 162 of the fourth access point 134 for transmitting data to the user equipment device 10, or both, without employing the beam sweeping procedures described above with respect to the first access point 104, the second access point 114, and the fifth access point 144. Depending on the embodiment, the user equipment device 10 may perform various processing functions to determine the third desirable beam 160 and the fourth desirable beam 162, one of the access points 104, 114, 124, 134, 144 may perform various processing functions to determine the third desirable beam 160 and the fourth desirable beam 162, or a combination of features in FIG. 3 (e.g., the user equipment device 10, the first access point 104, the second access point 114, the third access point 124, the fourth access point 134, the fifth access point 144) may perform processing functions to determine the third desirable beam 160 and the fourth desirable beam 162.

Figure 4:
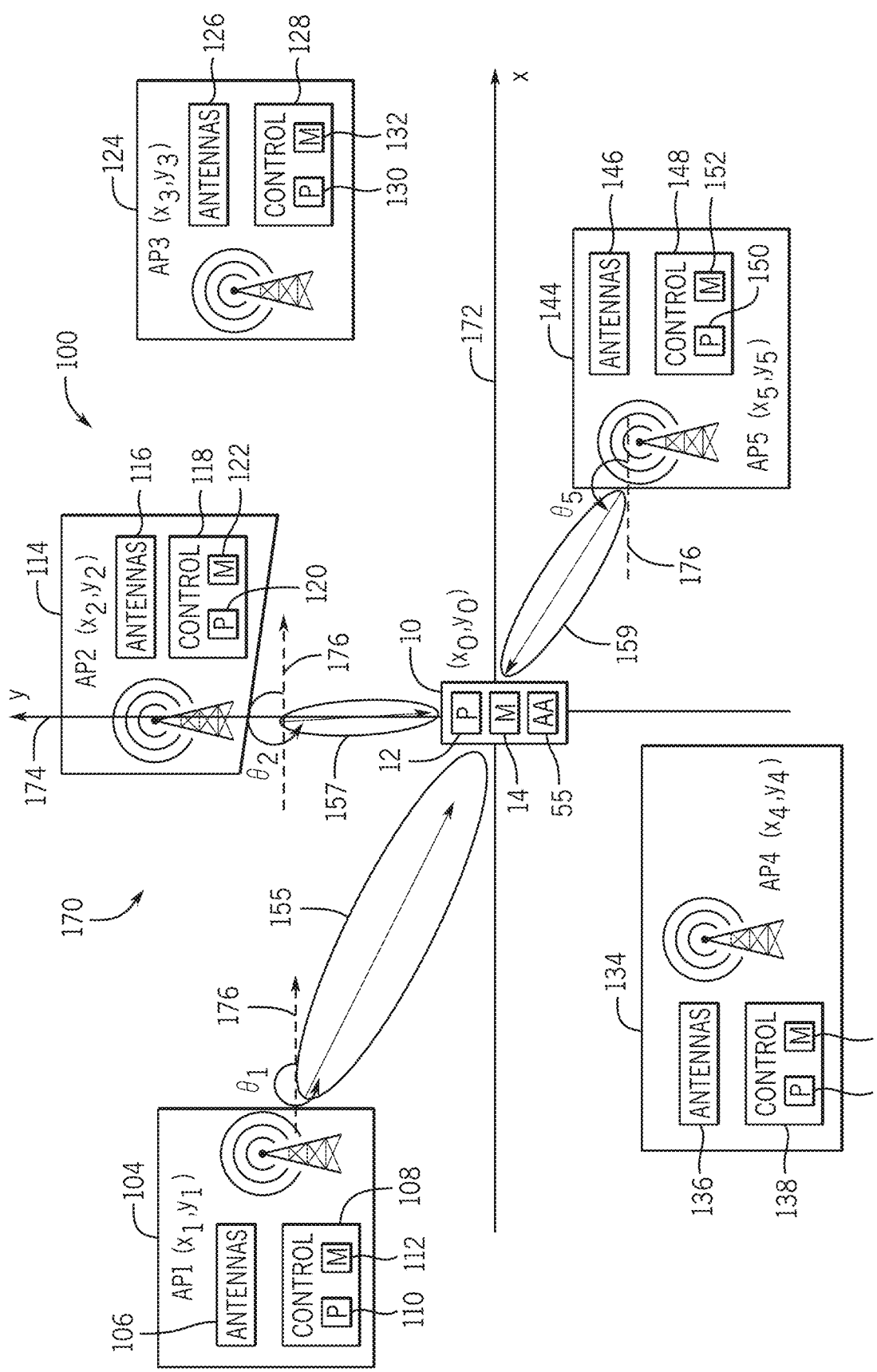
FIG. 4 is a schematic diagram of another embodiment of the distributed multi-antenna system of FIG. 3.

For example, FIG. 4 is a schematic diagram of an embodiment of the distributed multi-antenna system 100 of FIG. 3. FIG. 4 illustrates various data derived from beam sweeping procedures with respect to a first sub-set of access points and employed by a second sub-set of access points for estimating desirable beams of the second sub-set of access points. In the illustrated embodiment, the distributed multi-antenna system 100 includes a first sub-set of access points (e.g., the first access point 104, the second access point 114, and the fifth access point 144) and a second sub-set of access points (e.g., the third access point 124 and the fourth access point 134). As previously described with respect to FIG. 3, beam sweeping procedures may be performed with respect to the first sub-set of access points 104, 114, 144 to identify the desirable beams 155, 157, 159 employed by the first sub-set of access points 114, 124, 144, respectively, for communicating with the user equipment device 10. As described below, other data processing may be employed to identify desirable beams from the second sub-set of access points 134, 144.

For example, in the illustrated embodiment, the access points 104, 114, 124, 134, 144 and the user equipment device 10 are positioned on a coordinate system 170 having an X-axis 172 and a Y-axis 174. A first position of the first access point 104 is represented by coordinates $x_1$, $y_1$ on the coordinate system 170, a second position of the second access point 114 is represented by coordinates $x_2$, $y_2$ on the coordinate system 170, a third position of the third access point 124 is represented as coordinates $x_3$, $y_3$ on the coordinate system 170, a fourth position of the fourth access point 134 is represented by coordinates $x_4$, $y_4$ on the coordinate system 170, and a fifth position of the fifth access point 144 is represented by coordinates $x_5$, $y_5$ on the coordinate system 170. Although a position of the user equipment device 10 is represented as coordinates $x_0$, $y_0$ on the coordinate system 170 (e.g., the origin of the coordinate system 170), it should be noted that $x_0$, $y_0$ may be unknown to the various access points 104, 114, 124, 134, 144 in FIG. 4.

Further, the first desirable beam 155 corresponding to the first access point 104 may include a first angle $\theta_1$ relative to a direction 176, the second desirable beam 157 corresponding to the second access point 114 may include a second angle $\theta_2$ relative to the direction 176, and the fifth desirable beam 159 from the fifth access point 144 may include a fifth angle $\theta_5$ relative to direction 176. The first angle $\theta_1$, the second angle $\theta_2$, and the fifth angle $\theta_5$ may be referred to as "angles of departure" and may be known by their respective access points 104, 114, 144.

Certain of the above-described location and/or angle (e.g., angle of departure) data may be employed to determine desirable beams from the third access point 124 and the fourth access point 134. For example, one or more of the access points 104, 114, 124, 134, 144 may perform various such processing functions based on certain of the above-described data. That is, certain of the above-described location and/or angle data may be employed to determine a third angle (e.g., $\theta_3$) corresponding to the third desirable beam (not shown in FIG. 4) from the third access point 124 (e.g., relative to the direction 176) and a fourth angle (e.g., $\theta_4$) corresponding to the fourth desirable beam (not shown in FIG. 4) from the fourth access point 134 (e.g., relative to the direction 176). As an example, a matrix (e.g., Matrix 1) in the form of $B = A_Z + E$ may be employed to determine an estimation of the third desirable angle (e.g., $\theta_3$) and an estimation of the fourth desirable angle (e.g., $\theta_4$), where:

$$B = \begin{bmatrix} y_1 - \tan(\theta_1)x_1 \\ y_2 - \tan(\theta_2)x_2 \\ y_5 - \tan(\theta_5)x_5 \end{bmatrix}, \quad \text{Matrix 1}$$

$$A = \begin{bmatrix} -\tan(\theta_1) & 1 \\ -\tan(\theta_2) & 1 \\ -\tan(\theta_5) & 1 \end{bmatrix}, z = \begin{bmatrix} x_0 \\ y_0 \end{bmatrix}, \text{ and } E = \begin{bmatrix} e_1 \\ e_2 \\ e_5 \end{bmatrix}$$

It should be noted that $e_1$, $e_2$, and $e_5$ may represent random errors/uncertainties during measurement. Using least squares, the above-described matrix may be employed to estimate (or otherwise solve):

$$\hat{z} = [\hat{x}_0, \hat{y}_0]^T \quad \text{Equation 1:}$$

Further, Equation 1 may be employed to estimate (or otherwise solve):

$$\hat{\theta}_3 = \arctan\left\{\frac{y_3 - \hat{y}_0}{x_3 - \hat{x}_0}\right\} \quad \text{Equation 3}$$

-continued $$\hat{\theta}_4 = \arctan\left\{\frac{y_4 - \hat{y}_0}{x_4 - \hat{x}_0}\right\} \quad \text{Equation 4}$$

It should be noted that $\hat{\theta}_3$ from Equation 2 and $\hat{\theta}_4$ from Equation 3 may represent estimates of $\theta_3$ and $\theta_4$, respectively. Indeed, in accordance with the present disclosure, use of a hat above a variable may indicate that the variable is an estimate. However, it should also be noted that terms like "angle" and "estimated angle" may be used interchangeably herein, and terms like "position" and "estimated position" may also be used interchangeably herein.

Figure 5:
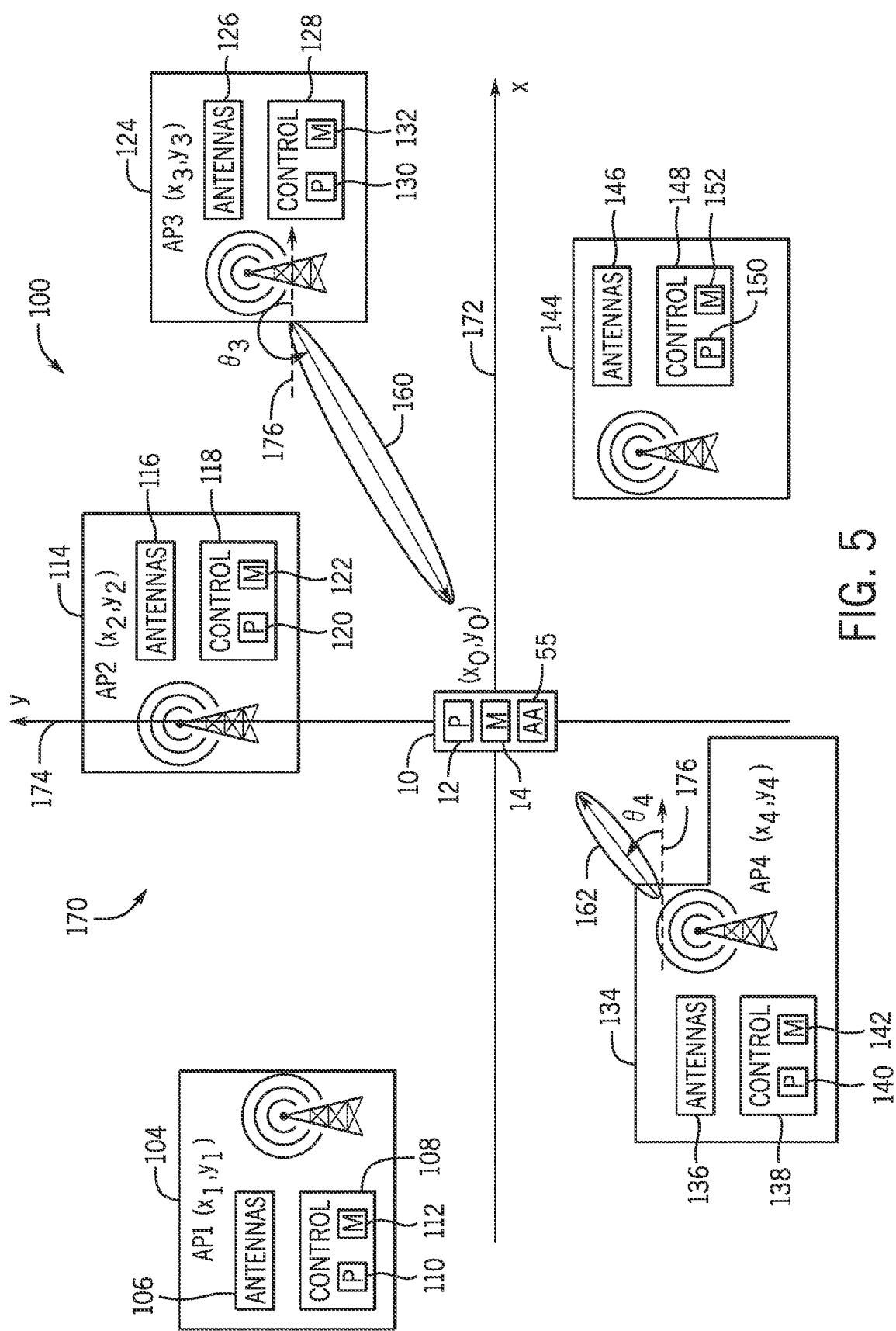
FIG. 5 is a schematic diagram of another embodiment of the distributed multi-antenna system of FIG. 3, according to the present disclosure.

The results of Equation 2 and Equation 3 may be employed to select desirable beams corresponding to the third access point 124 and the fourth access point 134. For example, FIG. 5 is a schematic diagram of an embodiment of the distributed multi-antenna system 100 of FIG. 3. In FIG. 5, the third desirable beam 160 of the third access point 124 includes the angle $\theta_3$ (e.g., relative to the direction 176), and the fourth desirable beam 162 of the fourth access point 134 includes the angle $\theta_4$ (e.g., relative to the direction 176).

In one embodiment, the third access point 124 may receive the above-described data employed in Equation 1 (with respect to Matrix 1), Equation 2, and Equation 3, to determine the third desirable beam 160, and/or the fourth access point 134 may receive the above-described data, employed in Equation 1 (with respect to Matrix 1), Equation 2, and Equation 3, to determine the fourth desirable beam 162. The data may be received by the third access point 124, for example, from the user equipment device 10 and/or one of the other access points of the system 100. The third access point 124 and the fourth access point 134 may receive the data from, for example, the user equipment device 10, the first access point 104, the second access point 114, the fifth access point 144, or any combination thereof. After the third desirable beam 160 is identified, the third access point 124 may employ a sub-set of the third antennas 126 corresponding to the third access point 124 to emit the third desirable beam 160 for transmitting data to the user equipment device 10. Likewise, after the fourth desirable beam 162 is identified, the fourth access point 134 may employ a sub-set of the fourth antennas 136 corresponding to the fourth access point 134 to transmit data to the user equipment device 10.

Figure 6:
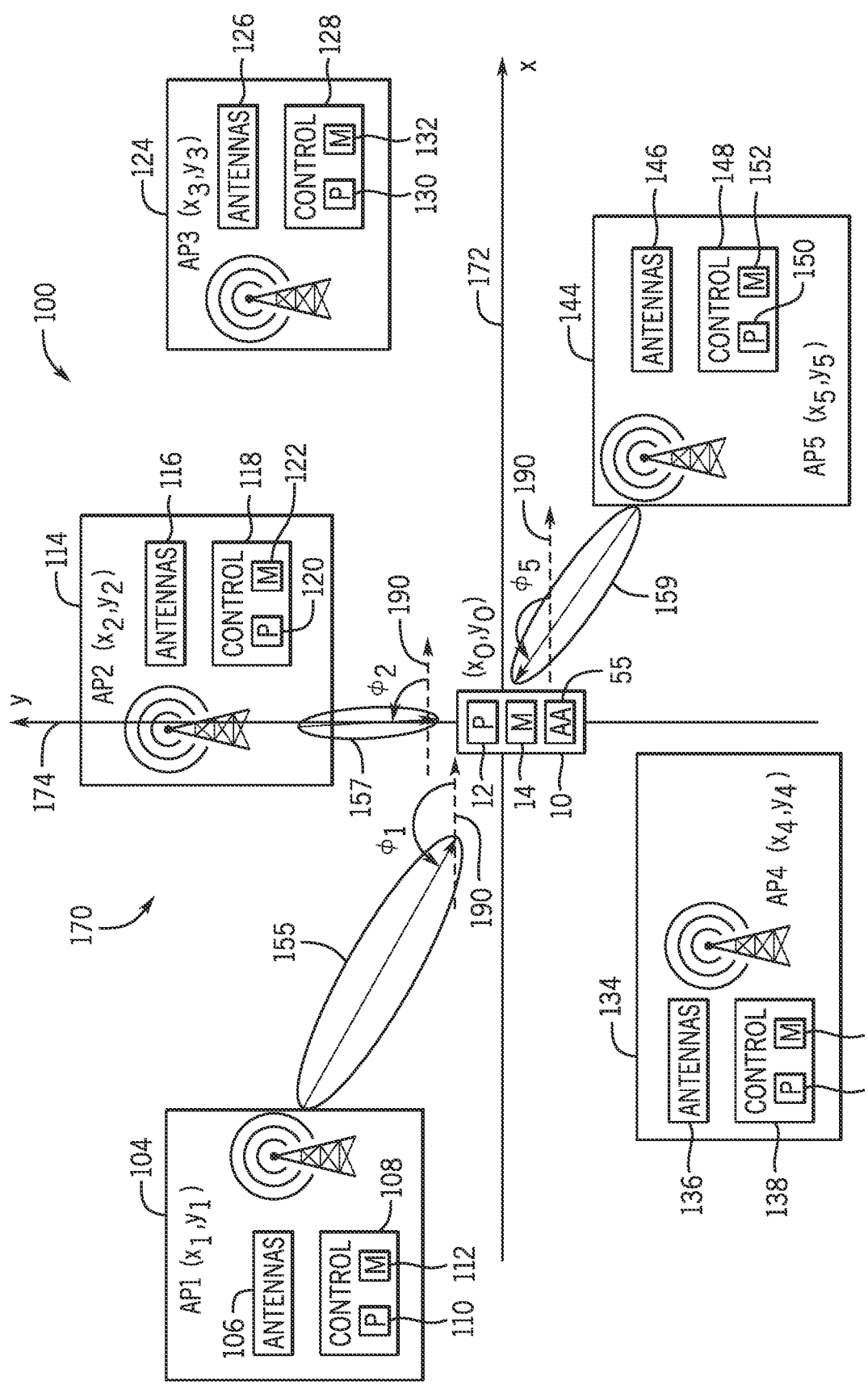
FIG. 6 is a schematic diagram of another embodiment of the distributed multi-antenna system of FIG. 3, according to the present disclosure.

While the examples provided above with respect to FIGS. 4 and 5 involve processing steps performed by one or more of the access points 104, 114, 124, 134, 144 to identify the third desirable beam 160 of the third access point 124 and the fourth desirable beam 162 of the fourth access point 134, certain embodiments of the present disclosure may involve processing steps performed by the user equipment device 10 to identify the third desirable beam 160 and the fourth desirable beam 162. For example, FIG. 6 is a schematic diagram of an embodiment of the distributed multi-antenna system 100 of FIG. 3. FIG. 6 illustrates illustrating various data derived from beam sweeping procedures with respect to a first sub-set of access points and employed by the user equipment device 10 for estimating desirable beams of a second sub-set of access points. In the illustrated embodiment, the distributed multi-antenna system 100 includes a first sub-set of access points (e.g., the first access point 104, the second access point 114, and the fifth access point 144) and a second sub-set of access points (e.g., the third access point 124 and the fourth access point 134). As previously described with respect to FIG. 3, beam sweeping procedures may be performed with respect to the first sub-set of access points 104, 114, 144 to identify the desirable beams 155, 157, 159 employed by the first sub-set of access points 104, 114, 144, respectively, for communicating with the user equipment device 10. As described below, other data processing may be employed (e.g., by the user equipment device 10) to identify desirable beams from the second sub-set of access points 134, 144.

For example, in the illustrated embodiment, the access points 104, 114, 124, 134, 144 and the user equipment device 10 are positioned on the coordinate system 170 having the X-axis 172 and the Y-axis 174. A first position of the first access point 104 is represented by coordinates $x_1, y_1$ on the coordinate system 170, a second position of the second access point 114 is represented by coordinates $x_2, y_2$ on the coordinate system 170, a third position of the third access point 124 is represented as coordinates $x_3, y_3$ on the coordinate system 170, a fourth position of the fourth access point 134 is represented by coordinates $x_4, y_4$ on the coordinate system 170, and a fifth position of the fifth access point 144 is represented by coordinates $x_5, y_5$ on the coordinate system 170. Further, a position of the user equipment device 10 is represented as coordinates $x_0, y_0$ on the coordinate system 170.

The first desirable beam 155 corresponding to the first access point 104 and received at the user equipment device 10 may include a first angle $\varnothing_1$ relative to a direction 190, the second desirable beam 157 corresponding to the second access point 114 and received at the user equipment device 10 may include a second angle $\varnothing_2$ relative to the direction 190, and the fifth desirable beam 159 from the fifth access point 144 and received at the user equipment device 10 may include a fifth angle $\varnothing_5$ relative to direction 190. The first angle $\varnothing_1$, the second angle $\varnothing_2$, and the fifth angle $\varnothing_5$ may be referred to as "angles of arrival" and may be estimated by the user equipment device 10, for example, during an RX beam sweeping procedure later described with respect to FIG. 8.

Certain of the above-described location and/or angle (e.g., angle of arrival) data may be employed by the user equipment device 10 to estimate or otherwise determine desirable beams from the third access point 124 and the fourth access point 134. As an example, the following system of equations may be employed by the user equipment device 10:

$$y_1 - \tan(\hat{\varnothing}_1)x_1 = y_0 - \tan(\hat{\varnothing}_1)x_0 + \tilde{e}_1 \qquad \text{Equation 4:}$$

$$y_2 - \tan(\hat{\varnothing}_2)x_2 = y_0 - \tan(\hat{\varnothing}_2)x_0 + \tilde{e}_2 \qquad \text{Equation 5:}$$

$$y_5 - \tan(\hat{\varnothing}_5)x_5 = y_0 - \tan(\hat{\varnothing}_5)x_0 + \tilde{e}_5 \qquad \text{Equation 6:}$$

It should be noted that $\tilde{e}_1, \tilde{e}_2,$ and $\tilde{e}_5$ may represent random errors/uncertainties during measurement. Using least squares, Equations 4-6 may be solved to reach the following:

$$\begin{bmatrix} \hat{x}_0 \\ \hat{y}_0 \end{bmatrix} = \left\{ \begin{bmatrix} -\tan(\hat{\varnothing}_1) & 1 \\ -\tan(\hat{\varnothing}_2) & 1 \\ -\tan(\hat{\varnothing}_5) & 1 \end{bmatrix} \begin{bmatrix} -\tan(\hat{\varnothing}_1) & 1 \\ -\tan(\hat{\varnothing}_2) & 1 \\ -\tan(\hat{\varnothing}_5) & 1 \end{bmatrix} \right\}^{-1} \begin{bmatrix} -\tan(\hat{\varnothing}_1) & 1 \\ -\tan(\hat{\varnothing}_2) & 1 \\ -\tan(\hat{\varnothing}_5) & 1 \end{bmatrix}^H \begin{bmatrix} y1 - \tan(\varnothing_1)x_1 \\ y1 - \tan(\varnothing_2)x_2 \\ y1 - \tan(\varnothing_5)x_5 \end{bmatrix} \qquad \text{Equation 7}$$

From Equation 7, the user equipment device 10 can infer angles of arrival corresponding to the desirable beams of the third access point 124 and the fourth access point 134 as follows:

$$\hat{\varnothing}_3 = \arctan\left\{\frac{y_3 - \hat{y}_0}{x_3 - \hat{x}_0}\right\} \qquad \text{Equation 8}$$

$$\hat{\varnothing}_4 = \arctan\left\{\frac{y_4 - \hat{y}_0}{x_4 - \hat{x}_0}\right\} \qquad \text{Equation 9}$$

Figure 7:
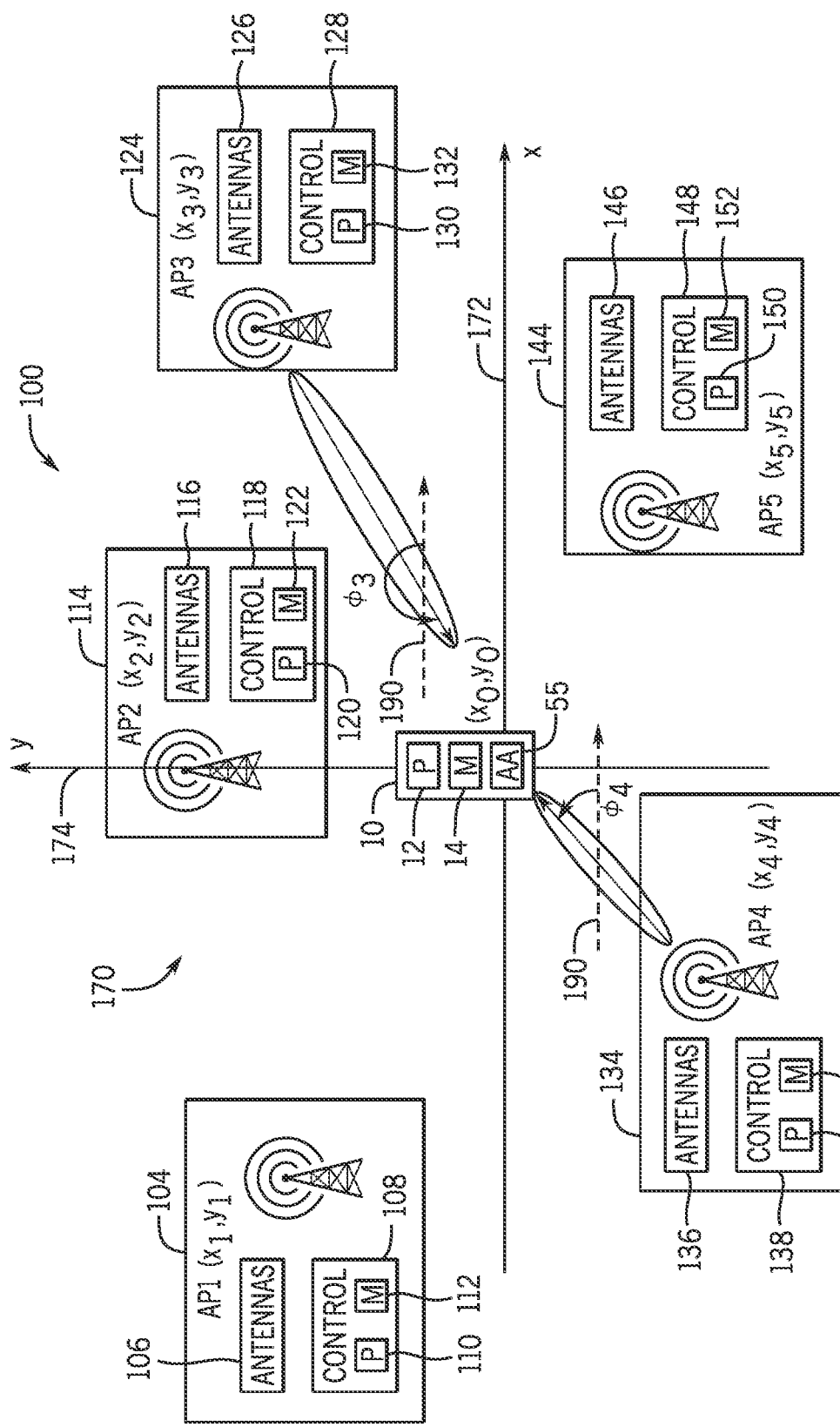
FIG. 7 is a schematic diagram of another embodiment of the distributed multi-antenna system of FIG. 3, according to the present disclosure.

The results of Equation 8 and Equation 9 may be employed to select desirable beams corresponding to the third access point 124 and the fourth access point 134. That is, the user equipment device 10 may transmit data indicative of $\hat{\varnothing}_3$ (which may be referred to as data indicative of the third desirable beam) to the third access point 124, and data indicative of $\hat{\varnothing}_4$ (which may be referred to as data indicative of the fourth desirable beam) to the fourth access point 134. FIG. 7 is a schematic diagram of an embodiment of the distributed multi-antenna system 100 of FIG. 3. In FIG. 7, the third desirable beam 160 of the third access point 124 includes the angle $\varnothing_3$ (e.g., relative to the direction 190), and the fourth desirable beam 162 of the fourth access point 134 includes the angle $\varnothing_4$ (e.g., relative to the direction 190).

Figure 8:
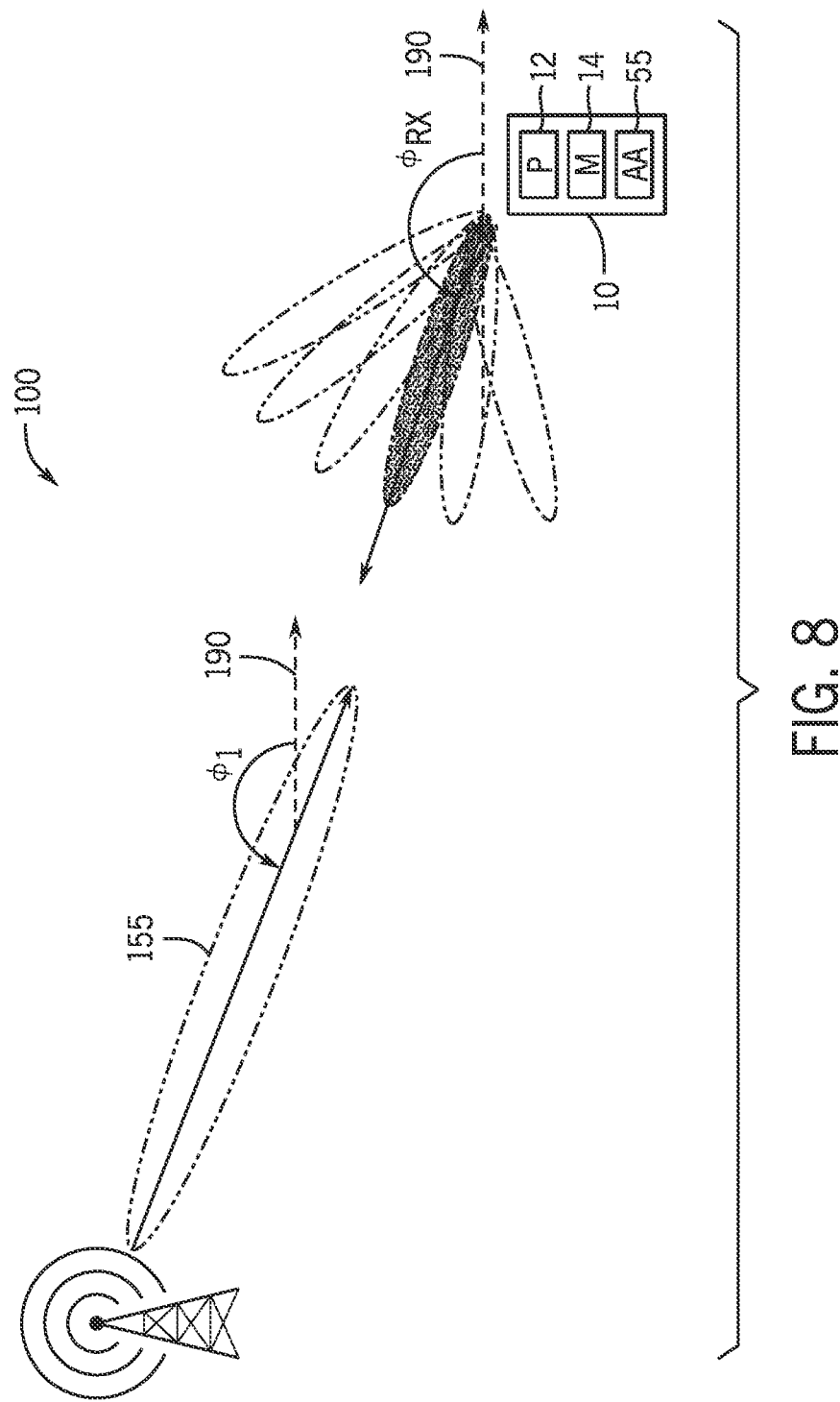
FIG. 8 is a schematic diagram of a portion of another embodiment of the distributed multi-antenna system of FIG. 3, according to the present disclosure.

Further, as previously described, it should be noted that the user equipment device 10 in FIGS. 6 and 7 may estimate an angle of arrival from an access point (e.g., of the first, second, and fifth access points 104, 114, 144) in a variety of ways. One example is provided in FIG. 8, which is a schematic diagram of an embodiment of a portion of the distributed multi-antenna system 100 of FIG. 3. In FIG. 8, the user equipment device 10 may estimate the angle of arrival (e.g., $\varnothing_1$) of the desirable beam 155 corresponding to the first access point 104 during an RX beam sweeping procedure in which a receiving (e.g., RX) beam 194 is selected by the user equipment device 10, where the angle of the RX beam 194 (e.g., $\varnothing_{RX}$) is employed to estimate the angle of arrival of the desirable beam 155 from the first access point 101 (e.g., $\varnothing_1 = \varnothing_{RX}$).

Figure 9:
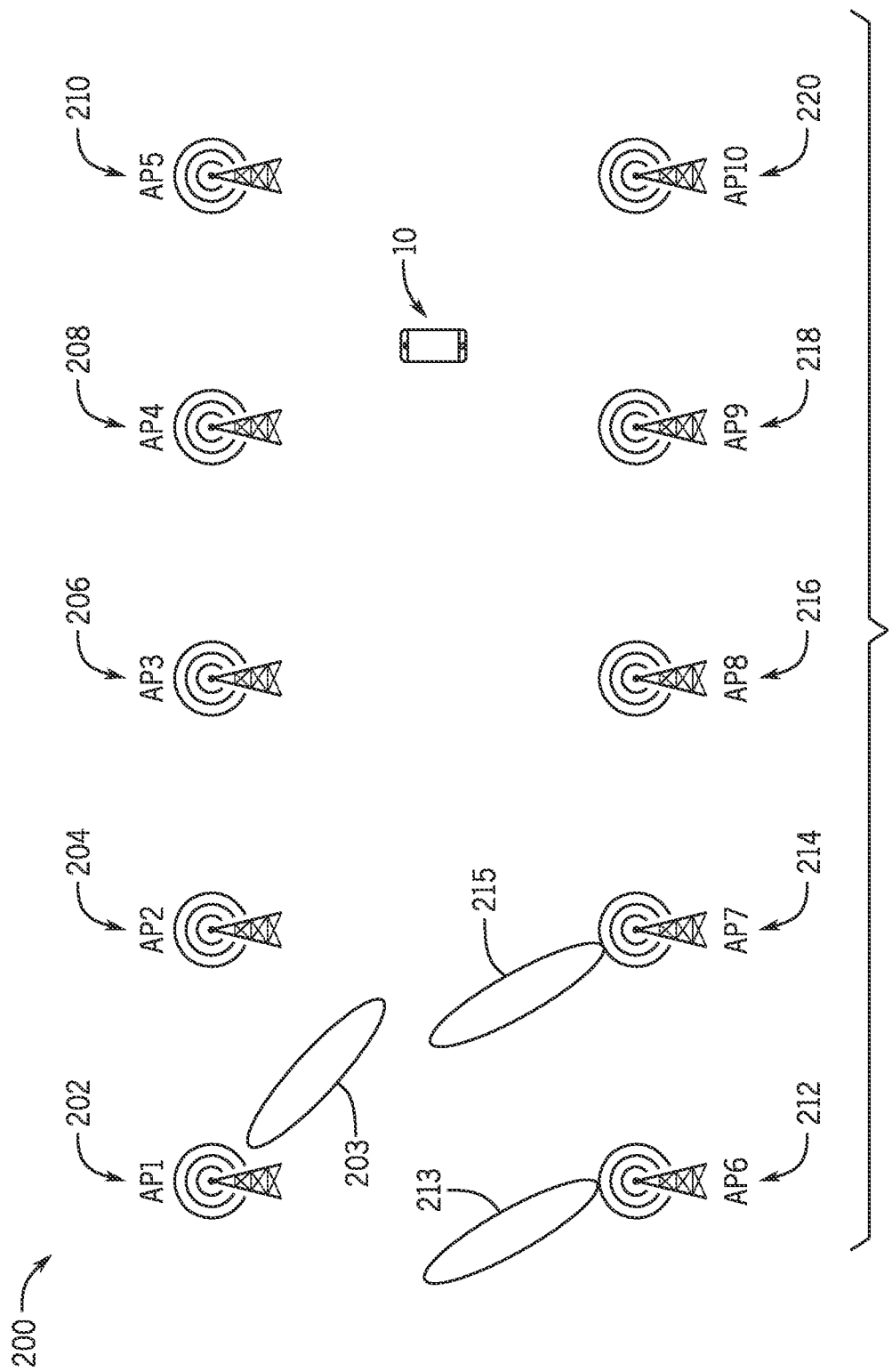
FIG. 9 is a schematic diagram of a distributed multi-antenna system including a user equipment device and ten access points (e.g., base stations, cellular towers) at a first moment or interval of time in an access point selection procedure, according to embodiments of the present disclosure.
Figure 10:
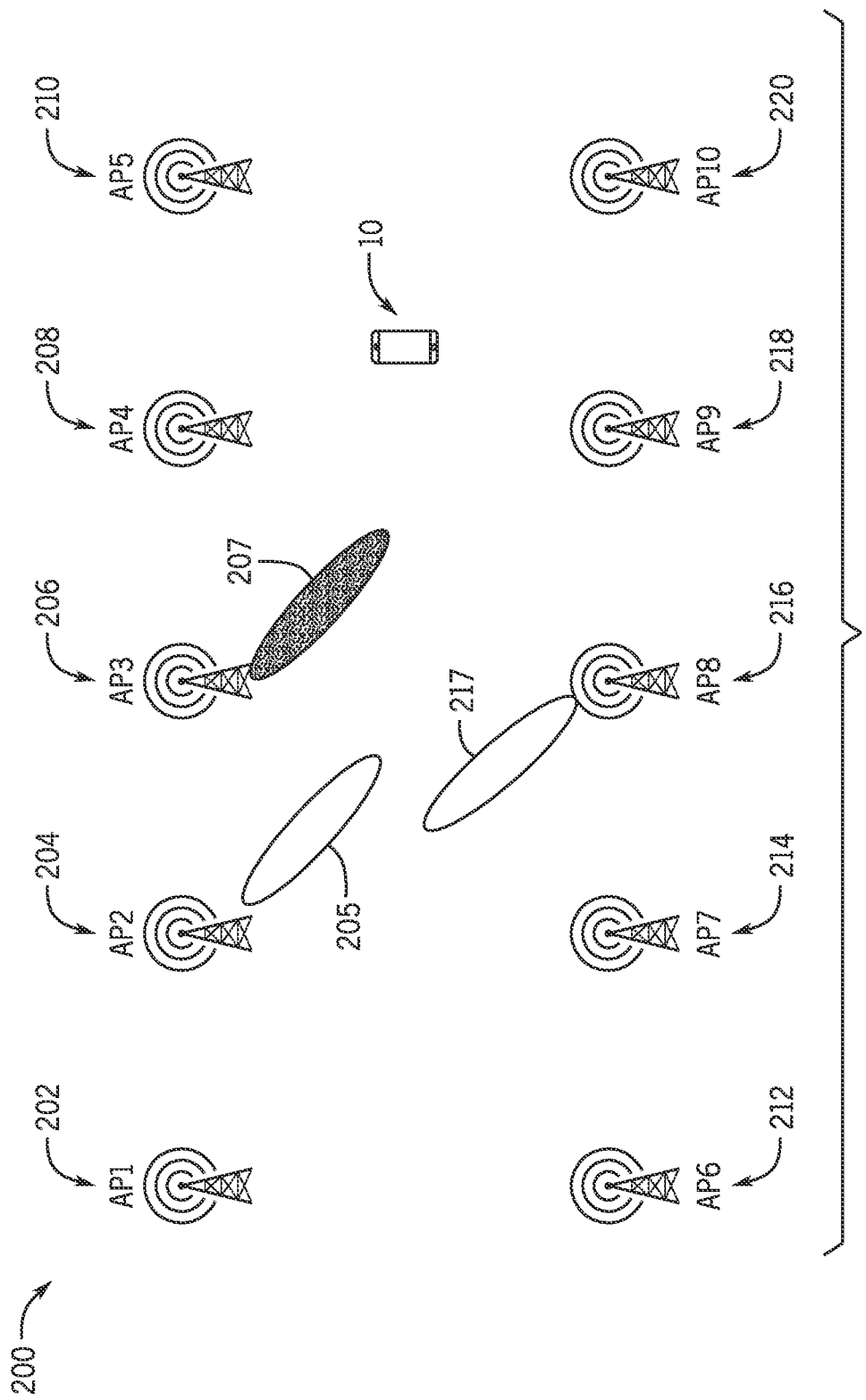
FIG. 10 is a schematic diagram of another embodiment of the distributed multi-antenna system of FIG. 9 at a second moment or interval of time in the access point selection procedure, according to the present disclosure.
Figure 11:
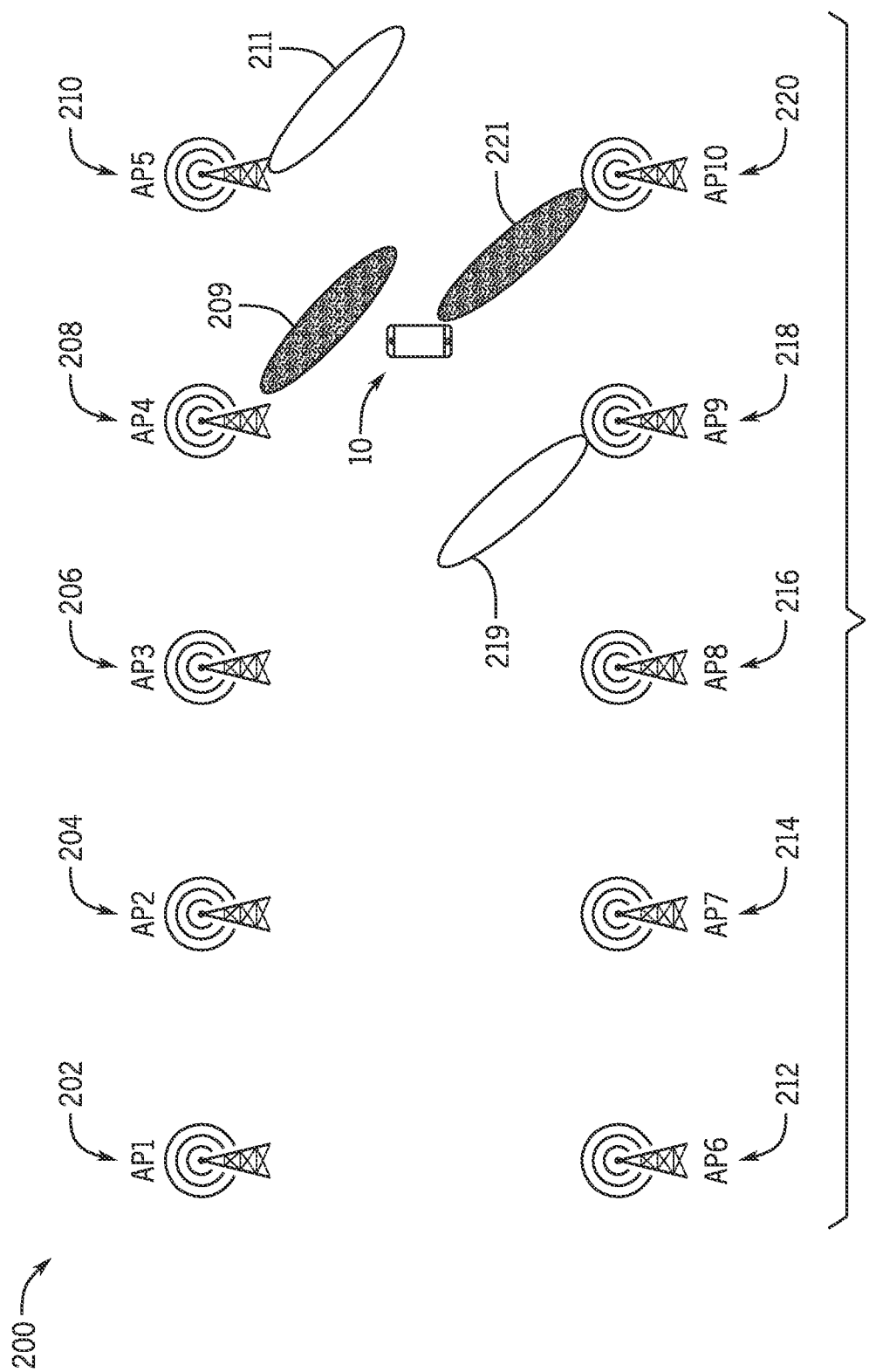
FIG. 11 is a schematic diagram of another embodiment of the distributed multi-antenna system of FIG. 9 at a third moment or interval of time in the access point selection procedure, according to the present disclosure.

FIGS. 9, 10, and 11 are schematic diagrams of an embodiment of a distributed multi-antenna system 200 including the user equipment device 10 and ten access points (e.g., base stations, cellular towers) at various moments or intervals of time (e.g., a first moment or interval of time corresponding to FIG. 9, a second moment or interval of time corresponding to FIG. 10, and a third moment or interval of time corresponding to FIG. 11) in an access point selection procedure. For example, the distributed multi-antenna system 200 includes a first access point 202, a second access point 204, a third access point 206, a fourth access point 208, a fifth access point 210, a sixth access point 212, a seventh access point 214, an eight access point 216, a ninth access point 218, and a tenth access point 220. The user equipment device 10 is also shown in each of FIGS. 9, 10, and 11. For purposes of clarity and brevity, processing circuitry, memory circuitry, and antennas are excluded from the illustrations in FIGS. 9, 10, and 11, but it should be understood that the various access points 202, 204, 206, 208, 210, 212, 214, 216, 218, 220 and the user equipment device 10 may include processing circuitry, memory circuitry, and antennas (e.g., as illustrated in FIGS. 3-8).

Beginning with FIG. 9, the first access point 202, the sixth access point 212, and the seventh access point 214 (which may form a "first sub-set of access points") may each transmit one or more beams. Beam sweeping procedures may be performed in an effort to identify desirable or suitable beams transmitted by the first, sixth, and/or seventh access points 202, 212, 214 (e.g., by determining signal strength measurements associated with the beam(s) emitted by the first, sixth, and/or seventh access points 202, 212, 214). As previously described, the signal strength measurements may include RSRP measurements, beam indexes, or both.

Further, the user equipment device 10 may compare the signal strength measurements with a threshold signal strength and identify whether the signal strength measurements exceed the threshold signal strength. In FIG. 9, a first beam 203 corresponding to the first access point 202, a sixth beam 213 corresponding to the sixth access point 212, and a seventh beam 215 corresponding to the seventh access point 214 are shown. However, the user equipment device 10 may determine that the signal strength measurements of the first, sixth, and seventh beams 203, 213, 215 do not exceed the threshold signal strength. In some embodiments, the user equipment device 10 may not even receive or otherwise detect the first, sixth, and seventh beams 203, 213, 215.

In FIG. 10, the second access point 204, the third access point 206, and the eight access point 216 (which may form a "second sub-set of access points") may each transmit one or more beams. Beam sweeping procedures may be performed in an effort to identify desirable or suitable beams transmitted by the second, third, and/or eighth access points 204, 206, 216 (e.g., by determining signal strength measurements associated with the beam(s) emitted by the second, third, and/or eighth access points 204, 206, 216). As previously described, the signal strength measurements may include RSRP measurements, beam indexes, or both.

Further, the user equipment device 10 may compare the signal strength measurements with a threshold signal strength and identify whether the signal strength measurements exceed the threshold signal strength. In FIG. 10, a second beam 205 corresponding to the second access point 204, a third beam 207 corresponding to the third access point 206, and an eighth beam 217 corresponding to the eighth access point 216 are shown. The user equipment device 10 may determine that the signal strength measurements of the second and eighth beams 205, 217 do not exceed the threshold signal strength, and that the signal strength measurement of the third beam 207 does exceed the threshold signal strength. In some embodiments, beam sweeping may be stopped in response to the user equipment device 10 identifying that, for example, the signal strength measurement of the third beam 207 exceeds the threshold signal strength. In other embodiments, the user equipment device 10 may continue with beam sweeping procedures relative to additional access points (e.g., a "third sub-set of access points" including the fourth access point 208, the fifth access point 210, the ninth access point 218, and the tenth access point 220) until the user equipment device 10 identifies a threshold number of beams having signal strength measurements that exceed the threshold signal strength.

For example, in FIG. 10, the fourth access point 208, the fifth access point 210, the ninth access point 218, and the tenth access point 220 (which may form a "third sub-set of access points") may each transmit one or more beams. Beam sweeping procedures may be performed in an effort to identify desirable or suitable beams transmitted by the fourth, fifth, ninth, and/or tenth access points 208, 210, 218, 220 (e.g., by determining signal strength measurements associated with the beam(s) emitted by the fourth, fifth, ninth, and/or tenth access points 208, 210, 218, 220). As previously described, the signal strength measurements may include RSRP measurements, beam indexes, or both.

Further, the user equipment device 10 may compare the signal strength measurements with a threshold signal strength and identify whether the signal strength measurements exceed the threshold signal strength. In FIG. 11, a fourth beam 209 corresponding to the fourth access point 208, a fifth beam 211 corresponding to the fifth access point 210, a ninth beam 219 corresponding to the ninth access point 218, and a tenth beam 221 corresponding to the tenth access point 210 are shown. The user equipment device 10 may determine that the signal strength measurements of the fifth and ninth beams 211, 219 do not exceed the threshold signal strength, and that the signal strength measurements of the fourth and tenth beams 209, 221 do exceed the threshold signal strength. In some embodiments, beam sweeping may be stopped in response to the user equipment device 10 identifying that, for example, the signal strength measurement of two or more beams (e.g., where a threshold number of beams is equal to two) exceed the threshold signal strength. It should be understood that the threshold number of beams may be greater than two in another embodiment. By employing the system 200 illustrated in FIGS. 9-11, beam sweeping may be performed with respect to individual sub-sets of access points at separate moments or intervals of time, while ultimately enabling the user equipment device 10 access the corresponding network.

Figure 12:
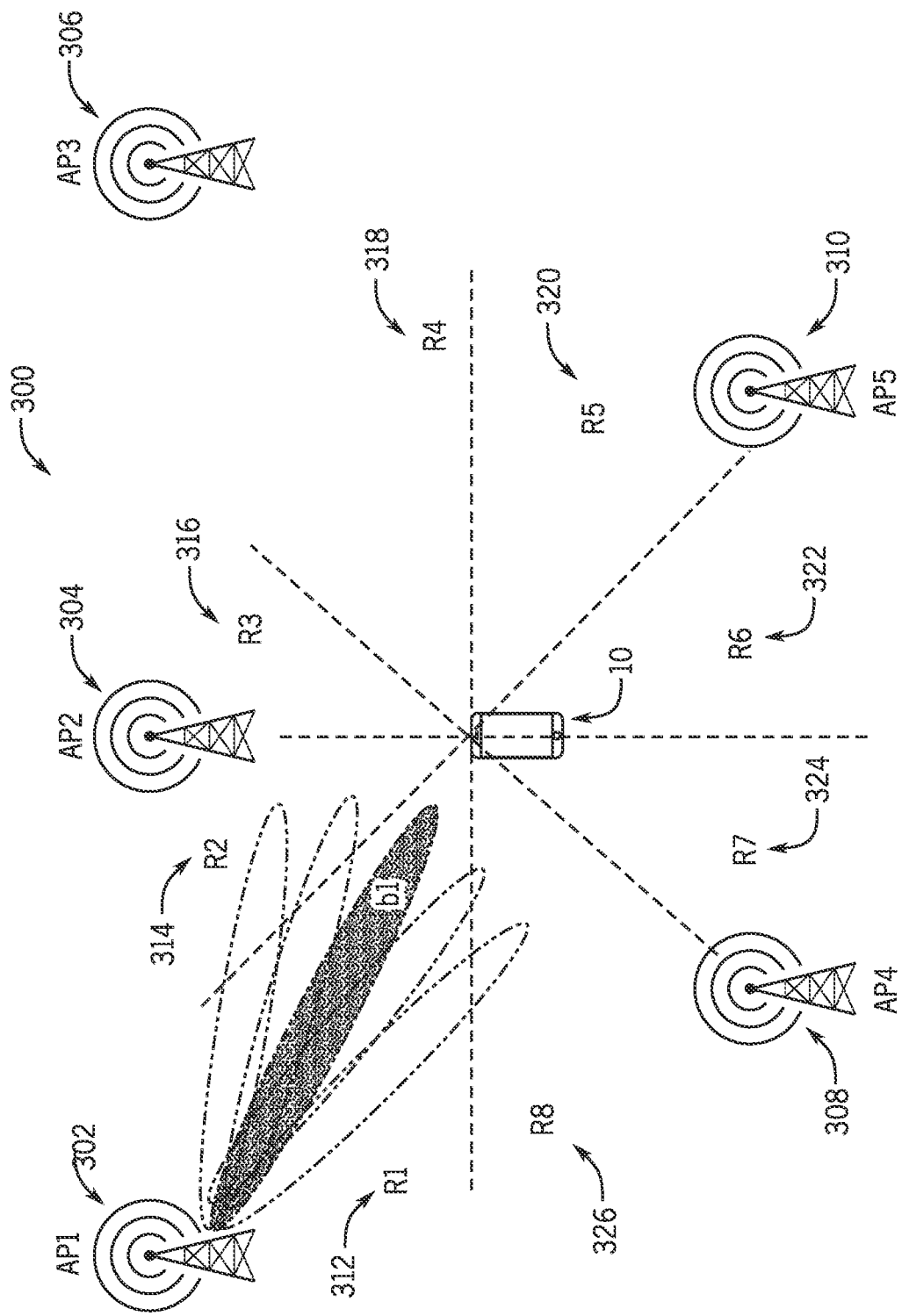
FIG. 12 is a schematic diagram of a distributed multi-antenna system employing a preconfigured division of regions to identify desirable beams between various access points (e.g., base stations, cellular towers) and a user equipment device, according to embodiments of the present disclosure.

FIG. 12 is a schematic diagram of a distributed multi-antenna system 300 employing a preconfigured division of regions to identify desirable beams between various access points (e.g., base stations, cellular towers) and the user equipment device 10. The access points include, for example, a first access point 302, a second access point 304, a third access point 306, a fourth access point 308, and a fifth access point 310. For purposes of clarity and brevity, processing circuitry, memory circuitry, and antennas are excluded from the illustration in FIG. 12, but it should be understood that the various access points 302, 304, 306, 308, 310 and the user equipment device 10 may include processing circuitry, memory circuitry, and antennas (e.g., as illustrated in FIGS. 3-8).

Certain aspects of FIG. 12 and the description below relate to RX beam sweeping procedures (e.g., beam sweeping procedures utilized to identify a desirable RX beam from the user equipment device 10). In traditional systems, RX beam sweeping may involve an access point transmitting a beam (e.g., TX beam) over time while the user equipment device 10 sweeps various RX beams to identify a desirable RX beam from the user equipment device 10. However, this can be time consuming and resource exhaustive. In accordance with the embodiment illustrated in FIG. 12, the access points 302, 304, 306, 308, 310 may signal to the user equipment device 10 the relative directions between the each of the access points 302, 304, 306, 307, 310 and the user equipment 10. For example, the first access point 302 may signal to the user equipment device 10 the relative direction between the first access point 302 and the user equipment device 10. This relative direction may be obtained at the first access point 302 during TX beam sweeping, for example, in terms of azimuth and/or elevation angles.

Additionally or alternatively, the relative direction may be represented by indexing a preconfigured region division. As an example, FIG. 12 includes a two-dimensional area divided into region one 312, region two 314, region three 316, region four 318, region five 320, region six 322, region seven 324, and region eight 326. The user equipment device 10 may receive an indication, for example, from the first access point 302 indicative of region one 312 in which the first access point 302 is disposed. The user equipment device 10 may employ the indication with other contextual information at the user equipment device 10 (e.g., data indicative of movement of the user equipment device 10, such as lateral or rotational movement, that occurred after TX beam sweeping) to subsequently perform RX beam sweeping in another region (e.g., the region two 314, region three 316, region four 318, region five 320, region six 322, region seven 324, and region eight 326), which is predicted based on the signaled region information as well as a local movement (e.g., lateral and/or rotational) pattern of the user equipment device 10.

In general, embodiments of the present disclosure are directed toward beam management for a distributed multi-antenna system employed in wireless network telecommunications, where at least one beam from at least one access point of the distributed multi-antenna system is selected without performing a beam sweeping procedure between the at least one access point and a user equipment device. For example, various information (e.g., location information of the access points and/or user equipment device, data indicative of other beams selected for other access points, etc.) may be employed by the distributed multi-antenna system to infer a best beam for transmitting data to the user equipment device via the at least one access point. In this way, technical effects or benefits associated with embodiments of the present disclosure include reducing resources required for establishing communications between the user equipment device and the access points of the distributed multi-antenna system, reducing an amount of time required to establish the communications between the user equipment device and the access points, reducing latency, reducing signaling overhead between the access points and user equipment device, and/or reducing a cost of the distributed multi-antenna system.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A distributed multi-antenna system, comprising:
a first access point configured to:
emit a first plurality of beams to a user equipment device, and
receive, from the user equipment device, a first indication of a first beam selected from the first plurality of beams via a beam sweeping procedure; and
a second access point configured to:
receive, from the user equipment device or the first access point, a second indication of the first beam selected from the first plurality of beams via the beam sweeping procedure, and
emit a second beam of a second plurality of beams corresponding to the second access point to transmit data to the user equipment device based on the second indication and a location of the second access point.

2. The distributed multi-antenna system of claim 1, wherein:
the first access point comprises a first plurality of antennas corresponding to the first plurality of beams, including a first set of antennas corresponding to the first beam; and
the second access point comprises a second plurality of antennas corresponding to the second plurality of beams, including a second set of antennas corresponding to the second beam.

3. The distributed multi-antenna system of claim 1, wherein the first access point is configured to transmit the second indication to the second access point based on receiving the first indication.

4. The distributed multi-antenna system of claim 1, further comprising a third access point configured to:
emit a third plurality of beams to the user equipment device, and
receive, from the user equipment device, a third indication of a third beam selected from the third plurality of beams via an additional beam sweeping procedure.

5. The distributed multi-antenna system of claim 4, wherein the second access point is configured to:
receive, from the user equipment device or the third access point, a fourth indication of the third beam selected from the third plurality of beams via the additional beam sweeping procedure, and
emit the second beam of the second plurality of beams corresponding to the second access point to transmit the data to the user equipment device based on the second indication, the fourth indication, and the location of the second access point.

6. The distributed multi-antenna system of claim 1, further comprising a third access point configured to:
receive, from the user equipment device or the first access point, a third indication of the first beam selected from the first plurality of beams via the beam sweeping procedure, and
emit a third beam of a third plurality of beams corresponding to the third access point to transmit additional data to the user equipment device based on the third indication and an additional location of the third access point.

7. The distributed multi-antenna system of claim 1, wherein the second access point is configured to determine the second beam of the second plurality of beams based on the second indication, the location of the second access point, and an additional location of the first access point.

8. The distributed multi-antenna system of claim 1, wherein:
the first access point comprises a first base station or first transmission and reception point (TRP); and
the second access point comprises a second base station or second TRP.

9. The distributed multi-antenna system of claim 1, wherein the first access point is configured to emit the first beam to transmit additional data to the user equipment device.

10. The distributed multi-antenna system of claim 1, further comprising three access points including the first access point, the second access point, and a third access point.

11. A user equipment device, comprising:
an antenna assembly;
a receiver configured to receive, via the antenna assembly and from a first access point of a distributed multi-antenna system, a first plurality of beams; and
a transmitter configured to transmit, via the antenna assembly, to a second access point of the distributed multi-antenna system, and based on a first location of the first access point, a second location of the second access point, and a first angle of arrival of a first beam selected from the first plurality of beams via a plurality of signal strength measurements corresponding to the first plurality of beams, an indication of a second beam selected from a second plurality of beams corresponding to the second access point or a second angle of arrival corresponding to the second beam.

12. The user equipment device of claim 11, further comprising processing circuitry configured to determine the second angle of arrival corresponding to the second beam based on the first location, the second location, and the first angle of arrival, wherein the transmitter is configured to transmit, via the antenna assembly, the indication of the second angle of arrival to the second access point.

13. The user equipment device of claim 11, wherein the transmitter is configured to transmit, via the antenna assembly and to the first access point, an additional indication of the first beam.

14. The user equipment device of claim 11, further comprising processing circuitry configured to:
determine a plurality of reference signal received power (RSRP) measurements corresponding to the plurality of signal strength measurements, a plurality of beam indexes corresponding to the plurality of signal strength measurements, or both; and
determine the first beam of the first plurality of beams based on the plurality of RSRP measurements, the plurality of beam indexes, or both.

15. The user equipment device of claim 11, wherein:
the receiver is configured to receive, via the antenna assembly and from a third access point of the distributed multi-antenna system, a third plurality of beams; and
the transmitter is configured to transmit, via the antenna assembly, the indication to the second access point of the distributed multi-antenna system based on the first location, the second location, the first angle of arrival, and a third angle of arrival of a third beam selected from the third plurality of beams via an additional plurality of signal strength measurements corresponding to the third plurality of beams.

16. The user equipment device of claim 11, further comprising processing circuitry configured to determine the first angle of arrival based on the first location and a third location of the user equipment device.

17. One or more tangible, non-transitory, computer-readable media storing instructions thereon that, when executed by one or more processors, are configured to cause the one or more processors to:
receive a first indication of a first beam of a first plurality of beams transmitted by a first access point to a user equipment device, the first indication of the first beam being based on a plurality of signal strength measurements of the first plurality of beams;
receive a second indication of a second beam of a second plurality of beams corresponding to a second access point, the second indication of the second beam being based on the first indication and location data indicative of a first location of the first access point and a second location of the second access point; and
establish a communication path between the user equipment device and the second access point via the second indication of the second beam.

18. The one or more tangible, non-transitory, computer-readable media of claim 17, wherein the instructions, when executed by the one or more processors, are configured to cause the one or more processors to receive a third indication of a third beam of a third plurality of beams transmitted by a third access point to the user equipment device, the third indication of the third beam being based on an additional plurality of signal strength measurements of the third plurality of beams, and the second indication of the second beam being based on the first indication, the third indication, and the location data.

19. The one or more tangible, non-transitory, computer-readable media of claim 17, wherein the instructions, when executed by the one or more processors, are configured to cause the one or more processors to establish an additional communication path between the user equipment device and the first access point via the first indication of the first beam.

20. The one or more tangible, non-transitory, computer-readable media of claim 17, wherein the instructions, when executed by the one or more processors, are configured to cause the one or more processors to:
determine a plurality of reference signal received power (RSRP) measurements corresponding to the plurality of signal strength measurements, a plurality of beam indexes corresponding to the plurality of signal strength measurements of the first plurality of beams, or both; and
determine, based on the plurality of RSRP measurements, the plurality of beam indexes, or both, the first beam of the first plurality of beams.

* * * * *